(12) United States Patent  (10) Patent No.: US 6,967,925 B2
Sato (45) Date of Patent: Nov. 22, 2005

(54) TRANSMISSION CONTROL METHOD AND DEVICE, AND TRANSMISSION APPARATUS

(75) Inventor: Ryuji Sato, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 787 days.

(21) Appl. No.: 09/798,931

(22) Filed: Mar. 6, 2001

(65) Prior Publication Data

US 2001/0040904 A1 Nov. 15, 2001

(30) Foreign Application Priority Data

May 12, 2000 (JP) .............................. 2000-140402

(51) Int. Cl.[7] .............................................. H04L 12/26
(52) U.S. Cl. .................... 370/235; 370/389; 370/395.1
(58) Field of Search .............................. 370/235, 236.1, 370/236.2, 389, 391, 395.1, 395.43, 395.6, 370/395.64

(56) References Cited

U.S. PATENT DOCUMENTS 5,799,003 A * 8/1998 Fujimaki et al. ......... 370/241.1
6,198,742 B1 * 3/2001 Saito et al. ............... 370/236.1
6,212,186 B1 * 4/2001 Tada et al. ................ 370/236.2
6,687,225 B1 * 2/2004 Kawarai et al. ......... 370/230.1

* cited by examiner

Primary Examiner—Chi Pham
Assistant Examiner—Anh-Vu H. Ly
(74) Attorney, Agent, or Firm—Venable LLP; Michael A. Sartori; Daniel G. Vivarelli, Jr.

(57) ABSTRACT

A transmission apparatus inserts unit signals into a stream transmitted from a first transmission path having a first bandwidth to a second transmission path having a second bandwidth. The insertion is controlled by an assignment signal that is generated by the following steps, which are repeated cyclically at intervals equivalent to the unit-signal length: a value representing the second bandwidth is added to a selected value; the sum is compared with a threshold; the assignment signal is set or reset according to the comparison result; the threshold value is subtracted from the sum to obtain a difference; and either the sum or the difference is selected, according to the assignment signal, as the selected value. This scheme enables bandwidth to be distributed evenly, thus reducing processing and memory requirements.

13 Claims, 6 Drawing Sheets

TRANSMISSION CONTROL METHOD AND DEVICE, AND TRANSMISSION APPARATUS

BACKGROUND OF THE INVENTION

The present invention relates to transmission apparatus of the general type that transmits a stream of unit signals and inserts further unit signals into the stream, more particularly to a method of controlling the points at which the further unit signals can be inserted.

Transmission apparatus of the above type is used in, for example, communication networks employing the asynchronous transfer mode (ATM). The unit signals in these networks are sequences of digital signals referred to as ATM cells, having a standard length of fifty-three bytes.

An example of an ATM transmission apparatus is shown in FIG. 1. The apparatus 10 includes a plurality of interface units 11, 12, 13, 14 and a switching unit 15. Interface unit 11, for example, includes a transmission convergence (TC) layer 11A that terminates a transmission path 21 that may have any of a variety of interface specifications, and an ATM layer 11B that is interconnected to the switching unit 15. Interface unit 13 includes a TC layer 13A that terminates another transmission path 23 and an ATM layer 13B connected to the switching unit 15. The other interface units have a similar structure (not visible). In all there are m interface units, n of which are disposed on the left side of the switching unit 15 in the drawing, where m and n are arbitrary positive integers (m>n).

The transmission paths 21, 23 may carry signals having various bit rates or speeds. The parts of, for example, TC layer 11A that process these signals operate at corresponding speeds. The ATM layer 11B operates at the fastest speed that might be encountered in the TC layer 11A. All of the ATM layers 11B, 13B, etc. have the same internal structure, so that a single type of ATM layer can be employed with transmission paths having different speeds just by changing the TC layer.

The term 'bandwidth' is often used as a synonym for bit rate or speed. Thus if TC layer 11A and ATM layer 11B are capable of processing signals at rates of A bits per second and B bits per second, respectively, they will be said to have bandwidths of A and B. In this case, A cannot exceed B ($A \leq B$). If valid user cells are being transmitted at a rate of C bits per second, the user cell traffic will be said to occupy a bandwidth C, which must not exceed either A or B ($C \leq A \leq B$). Parts of the bandwidth B not occupied by user cells are filled with idle cells, and with management cells used for the management of system resources.

The user cell traffic is controlled so that bandwidth C is distributed substantially evenly within the bandwidth B of the ATM layer 11B; that is, user cells are kept moving through the ATM layer at a substantially even rate. The reason for this is that if bandwidth C were to be concentrated into one part of bandwidth B (if the user cell traffic were to bunch up), then during the corresponding intervals of time, bandwidth B would be effectively filled, and large buffers would be required for bit-rate conversion from the ATM layer 11B to the TC layer 11A. An even distribution of the user cell bandwidth C within the bandwidth B of the ATM layer reduces the required buffer memory capacity of the apparatus.

The management cells mentioned above are inserted by the ATM layer. A problem that occurs in conventional ATM transmission apparatus is that insertion of these management cells can disturb the even cell distribution, causing the combined non-idle cell traffic to become overconcentrated in certain parts of the ATM-layer bandwidth B. In the worst case, the user-cell bandwidth and management-cell bandwidth may together exceed the bandwidth capability A of the TC layer, forcing user cells to be dropped.

SUMMARY OF THE INVENTION

An object of the present invention is to insert management cells into an ATM cellstream while maintaining an even distribution of assigned bandwidth.

A more general object is to insert further unit signals into a stream of unit signals while maintaining an even distribution of unit signals in the stream.

The invented method accordingly controls the insertion of first unit signals into a stream of second unit signals transmitted from a first transmission path having a first bandwidth to a second transmission path having a second bandwidth, by assigning points at which the first unit signals may be inserted. The method comprises the steps of:

(a) adding a value representing the second bandwidth to a selected value to obtain a sum value;

(b) comparing the sum value with a threshold value representing the first bandwidth to generate an assignment signal designating the points at which the first unit signals may be inserted;

(c) subtracting the threshold value from the sum value to obtain a difference value;

(d) selecting either the sum value or the difference value as the selected value, responsive to the assignment signal; and (e) repeating steps (a) to (d) at unit intervals equal to the length of the first and second unit signals.

The invention also provides a transmission control device and transmission apparatus using the invented method, including a first arithmetic unit performing step (a), a comparator performing step (b), a second arithmetic unit performing step (c), and a selector performing step (d).

DETAILED DESCRIPTION OF THE INVENTION

Figure 1:
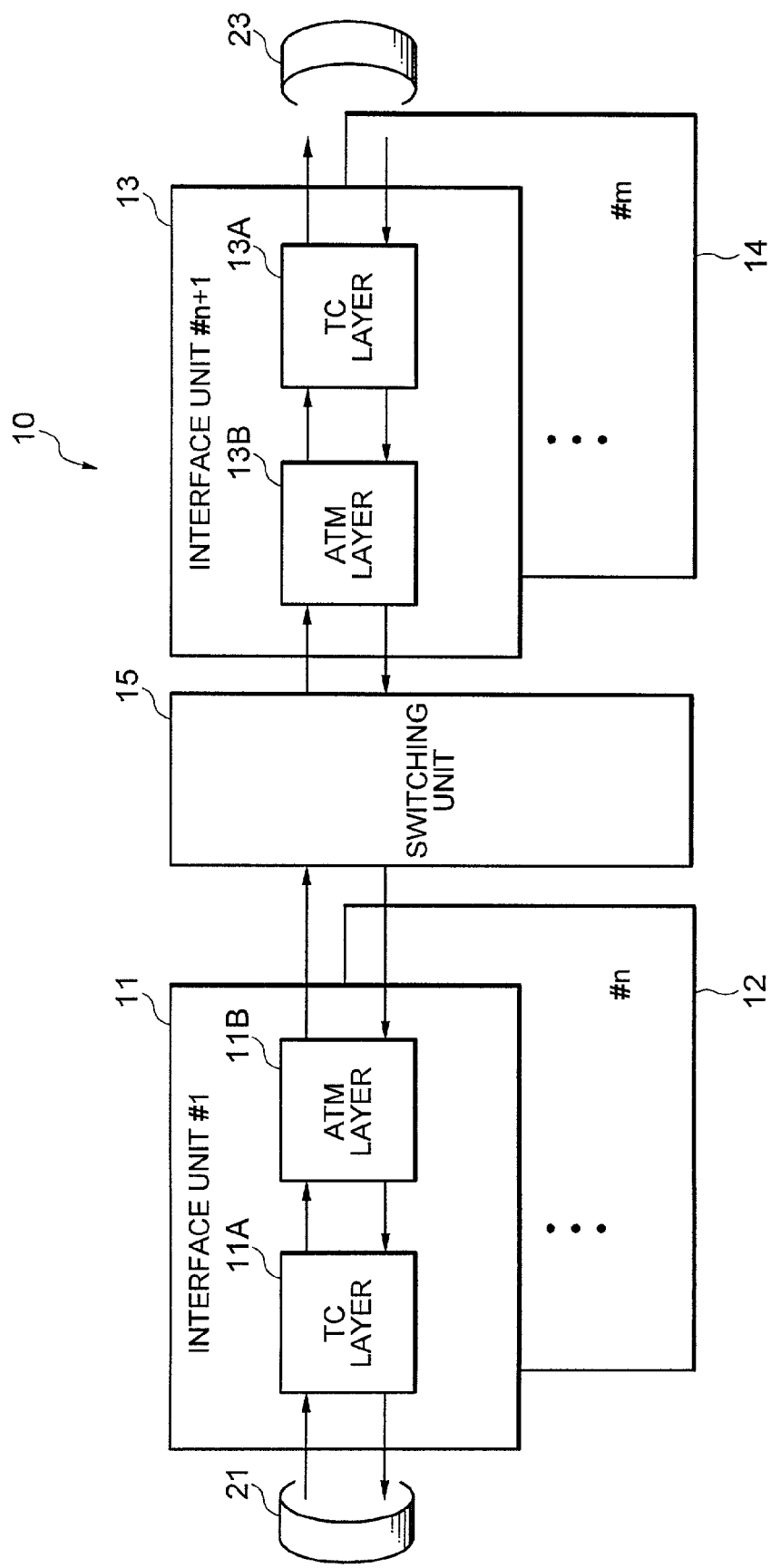
FIG. 1 is a block diagram of an ATM transmission apparatus.

An embodiment of the invention will be described with reference to the attached drawings, in which like parts are indicated by like reference characters.

Figure 2:
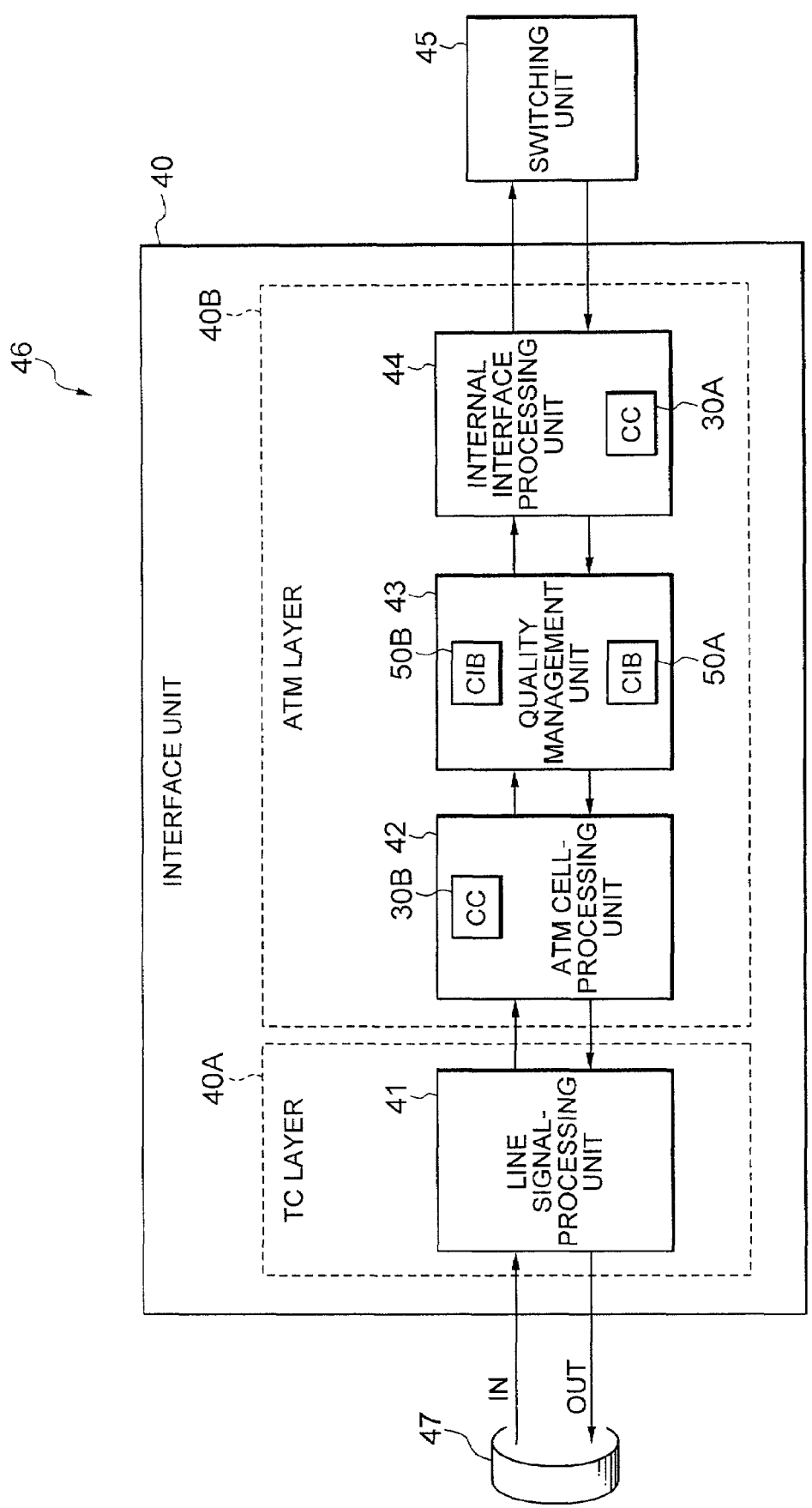
FIG. 2 is a partial block diagram of an ATM transmission apparatus embodying the invention.

Referring to FIG. 2, the embodiment is a transmission apparatus 46 including a plurality of interface units 40, only one of which is shown. Each interface unit 40 has a TC layer 40A and an ATM layer 40B. The TC layer 40A includes a line signal-processing unit 41. The ATM layer 40B includes an ATM cell-processing unit 42, a quality management unit 43, and an internal interface processing unit 44. The ATM cell-processing unit 42 includes a control circuit (CC) 30B, the quality management unit 43 includes a pair of cell insertion blocks (CIBs) 50A, 50B, and the internal interface processing unit 44 includes a control circuit 30A. The internal interface processing unit 44 is coupled to a switching unit 45. The line signal-processing unit 41 is coupled to an external transmission path 47.

Incoming signals from the external transmission path 47 are terminated by the line signal-processing unit 41, which passes an ATM cellstream to the ATM cell-processing unit 42. The ATM cell-processing unit 42 obtains synchronization with the ATM cellstream and reformats the ATM cells to facilitate processing by the other parts of the transmission apparatus 46. The quality management unit 43 manages bandwidth and ensures that quality-of-service requirements are met. The internal interface processing unit 44 interfaces the ATM cellstream to the switching unit 45.

In the outgoing direction, the ATM cellstream from the switching unit 45 is processed by the internal interface processing unit 44, then passed to the quality management unit 43, which again performs bandwidth management and quality-of-service assurance functions. The ATM cell-processing unit 42 converts the ATM cells from the format used within the apparatus to the standard ATM cell format. The line signal-processing unit 41 generates the signals that send the ATM cellstream on the external transmission path 47.

To enable the quality management unit 43 to carry out its management and assurance functions, the cell insertion blocks 50A, 50B insert special ATM cells referred to herein as quality management cells in the incoming and outgoing cellstreams. These cells are also known as resource management cells, or simply as 'management cells' as in the background discussion above. Control circuits 30A and 30B monitor the cellstreams and decide where quality management cells may be inserted. This process is also a type of bandwidth management, and the control circuits 30A, 30B may also be referred to as valid bandwidth management units.

Control circuit 30A generates a Cell Assignment signal indicating where quality management cells may be inserted in the incoming cellstream. Control circuit 30B generates a Cell Assignment signal indicating where quality management cells may be inserted in the outgoing cellstream. The quality management unit 43 receives these Cell Assignment signals from the ATM cell-processing unit 42 and internal interface processing unit 44 together with the incoming and outgoing cellstreams.

Figure 3:
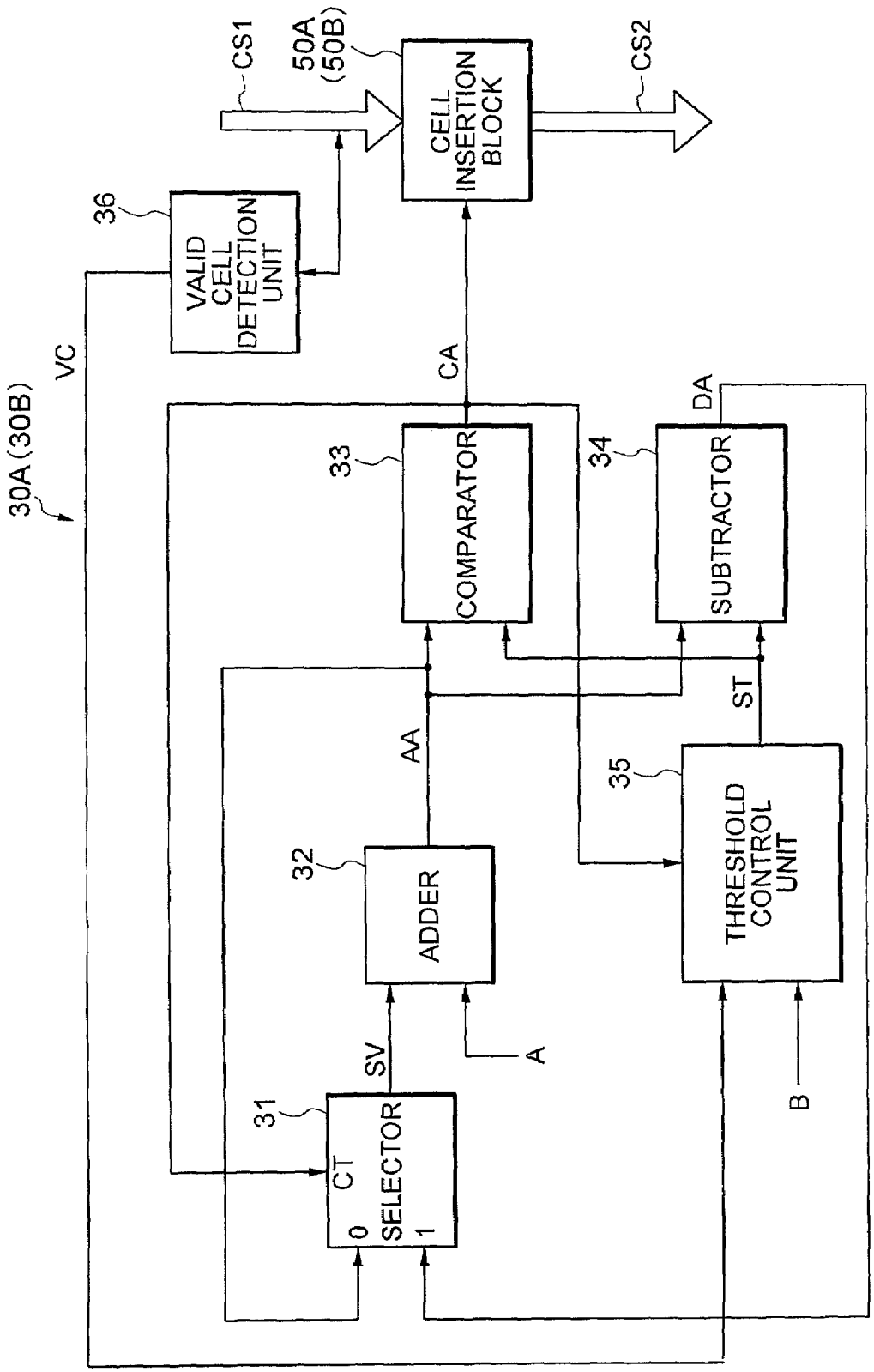
FIG. 3 is a more detailed block diagram of one of the control circuits in FIG. 2.

Both control circuits 30A, 30B have the internal configuration shown in FIG. 3, each comprising a selector 31, an adder 32, a comparator 33, a subtractor 34, a threshold control unit 35, and a valid cell detection unit 36. These elements operate at unit intervals equal to one ATM cell interval in the cellstream that passes through the quality management unit 43. If, for example, the internal ATM cell format is fifty-four bytes long, including the standard fifty-three bytes and a one-byte internal switching tag, then the control circuits 30A, 30B operate cyclically with a cycle time equivalent to fifty-four bytes in the cellstream.

The cellstream entering the quality management unit 43 is denoted CS1 in FIG. 3; the cellstream leaving the quality management unit 43 is denoted CS2. The letters A and B denote values corresponding to the bandwidths of the TC layer 40A and ATM layer 40B, respectively. The TC-layer bandwidth value A may be stored in a register (not visible) while the control circuit is operating. The ATM-layer bandwidth value B may also be stored in a register, or may be hard-wired into the threshold control unit 35.

The adder 32, functioning as the first arithmetic unit, adds the TC-layer bandwidth value A to a selected value (SV) received from the selector 31 and outputs the resulting sum AA.

The threshold control unit 35 receives the ATM-layer bandwidth value B, the Cell Assignment signal (CA), and a Valid Cell detection signal (VC). On the basis of these input values, the threshold control unit 35 generates a Subtrahend-Threshold signal (ST). The ATM-layer bandwidth B has a fixed value corresponding to, for example, the maximum speed of any external transmission path to which the transmission apparatus might be connected. The Valid Cell detection signal VC will be described later.

The comparator 33 compares the signals AA and ST output by the adder 32 and threshold control unit 35 and generates the Cell Assignment signal (CA), using ST as a threshold value. The Cell Assignment signal CA is supplied to the relevant cell insertion block 50A or 50B in the quality management unit 43, and also to the selector 31. In the following description, CA is a logic signal that is set at the high logic level, indicating that a quality management cell may be inserted, when AA is equal to or greater than ST, and is reset to the low logic level, indicating that a quality management cell may not be inserted, when AA is less than ST. The cell insertion block 50A or 50B is not forced to insert a quality management cell when CA is high, but may do so if necessary.

Signals AA and ST are also supplied to the subtractor 34, which functions as the second arithmetic unit. Using ST as a subtrahend, the subtractor 34 subtracts ST from AA and outputs their difference DA. The difference may be positive or negative, so the difference signal DA includes a sign bit.

The selector 31 has a control terminal (CT) that receives the Cell Assignment signal CA, another input terminal, labeled '0' in the drawing, that receives the sum signal AA from the adder 32, and still another input terminal, labeled '1' in the drawing, that receives the difference signal DA from the subtractor 34. The selector 31 selects the sum signal AA when CA is low ('0'), selects the difference signal DA when CA is high ('1'), and outputs the selected signal as the Selected Value SV.

The valid cell detection unit 36 monitors the cellstream CS1 entering the quality management unit 43 to detect valid user cells, that is, valid ATM cells addressed to a user, and generates the Valid Cell signal. This signal is active when a valid cell is detected, and is inactive when, for example, an idle cell is detected.

In the quality management unit 43, cell insertion block 50A or 50B inserts quality management cells, if necessary, when permitted to do so by the Cell Assignment signal. The cellstream CS2 leaving the quality management unit 43 has the same speed as the entering cellstream CS1. The two cellstreams CS1, CS2 are normally identical except for the presence in cellstream CS2 of quality management cells inserted by the cell insertion block 50A or 50B.

Two examples of the operation of the transmission apparatus 46 will be given next. In both examples, the TC-layer bandwidth value A is ten (A=10), and the ATM-layer bandwidth value B is thirty-five (B=35).

Figure 4:
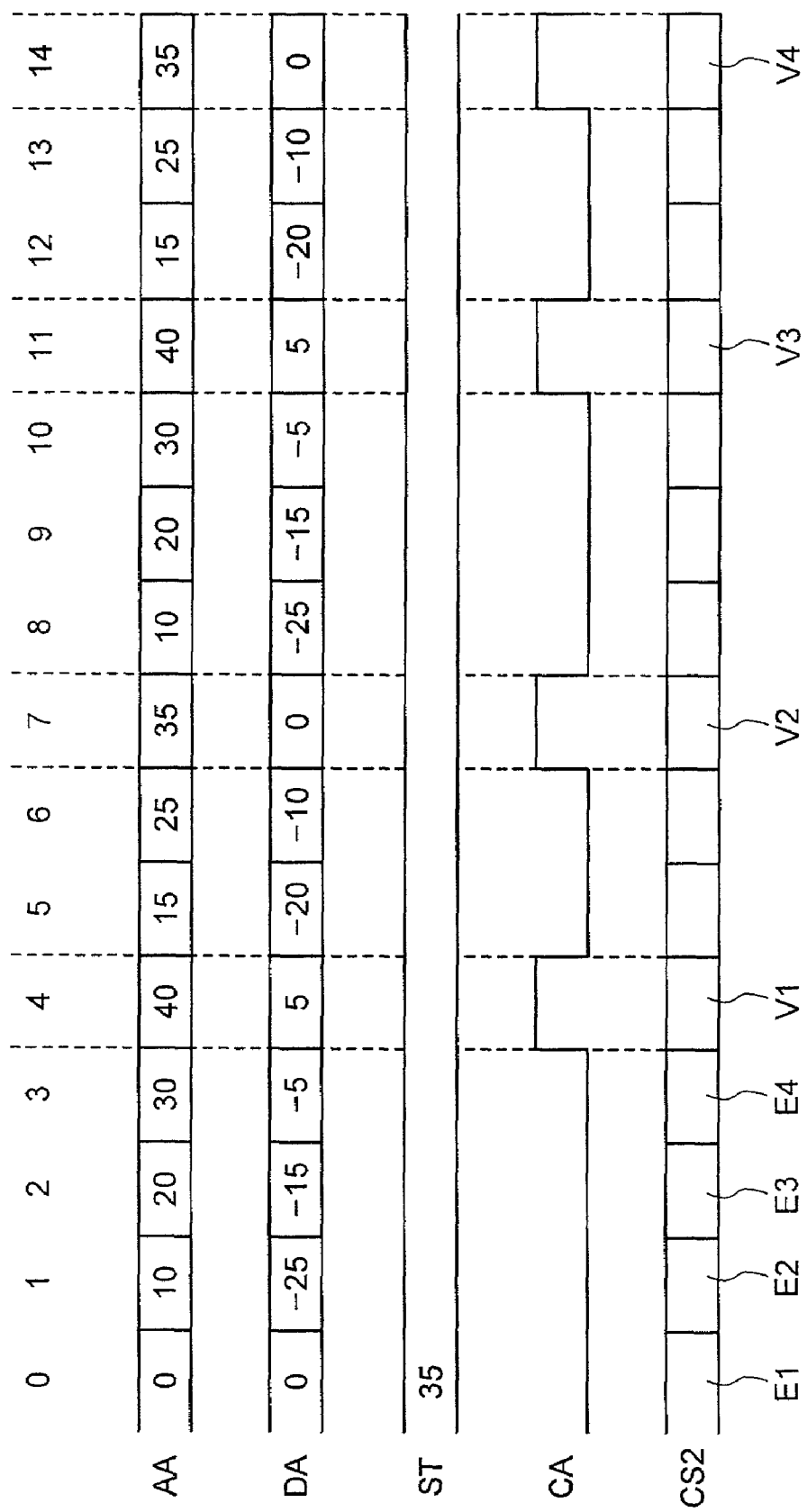
FIGS. 4 and 5 are timing diagrams illustrating the operation of the control circuit in FIG. 3.

Referring to FIG. 4, in the first example, no valid cells are detected, and the Subtrahend-Threshold signal ST remains fixed at a value equal to the B (thus, ST=35). The cell numbers at the top of FIG. 4 indicate consecutive cell periods or slots in the ATM cellstreams CS1, CS2. All ATM cells in cellstream CS1 are idle cells containing no valid user information.

The adder output AA and subtractor output DA both start at zero during cell period zero. Since AA (zero) is less than ST (thirty-five), the Cell Assignment signal CA is low during this period and the quality management unit 43 is not permitted to insert a quality management cell in the first cell slot E1 in cellstream CS2.

The low CA signal causes the selector 31 to select the AA signal, so in the next cell period, the adder 32 adds A to AA, increasing AA from zero to ten. This value is still less than the threshold value ST, so CA remains low, preventing a quality management cell from being inserted in cell slot E2 in cellstream CS2. The subtractor 34 subtracts ST from AA, obtaining a DA value of minus twenty-five.

Similar operations continue in the following two cell periods, AA and DA increasing by ten in each period. No quality management cell can be inserted in either of the corresponding cell slots E3 and E4 in cellstream CS2. Cell slots E1, E2, E3, E4 all hold idle cells.

In cell period four, AA reaches forty, which exceeds the threshold value ST, so the CA signal goes high, enabling a quality management cell to be inserted in the corresponding cell slot V1 in cellstream CS2. If a quality management cell is waiting to be inserted at this time, it is inserted in this cell slot V1. The high CA signal causes the selector 31 to select the DA signal, which is always thirty-five (ST) less than AA and now has the value five.

In cell period five, the adder 32 adds A (ten) to DA (five), obtaining fifteen as the new value of AA. This is less than the threshold ST, so the CA signal goes low again. In cell period six, the selector 31 selects the AA signal, to which the adder 32 adds the value of A, so AA increases from fifteen to twenty-five. This is still less than the threshold ST, so the CA signal remains low.

In cell period seven, AA reaches thirty-five, which is equal to the threshold ST, so the CA signal goes high. If necessary, a quality management cell can be inserted in the corresponding cell slot V2 in cellstream CS2. The high CA signal causes the selector 31 to select the DA signal, which is now equal to zero. In cell period eight, the adder 32 adds A (ten) to this DA value (zero) and AA returns to the same value (ten) as in cell period one.

As long as no valid user cells are detected, the above operation repeats cyclically. Quality management cells can be inserted, if necessary, in two out of every seven cell periods, at alternating intervals of three and four cells: for example, in cell slots V3, V4, and so on. These cell slots are distributed as evenly as possible in cellstream CS2.

In effect, the TC-layer bandwidth A (ten) is being distributed evenly in the ATM-layer bandwidth B (thirty-five) in FIG. 4. In the outgoing direction, the cellstream that leaves the interface unit 40 and is transmitted on the external transmission path 47 includes only quality management cells and idle cells taken from the valid cell slots V1, V2, V3, V4, . . . in cellstream CS2.

Figure 5:
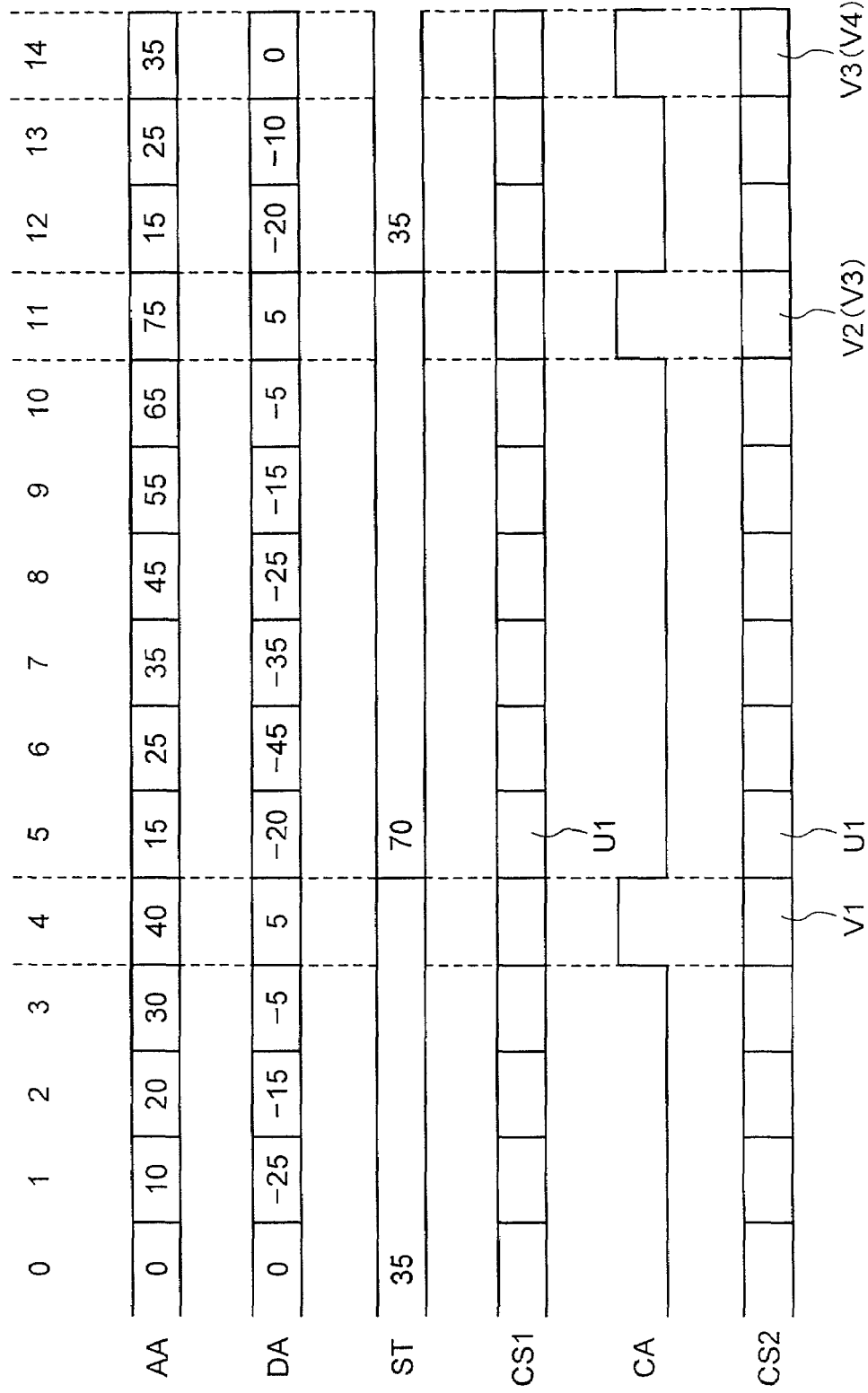

Referring to FIG. 5, in the second example of the operation of the transmission apparatus 46, cellstream CS1 includes a user cell. Accordingly, cellstream CS1 is shown, in addition to the other signals that were shown in FIG. 4. In this example, when the Valid Cell detection signal becomes active, the threshold control unit 35 adds bandwidth value B to the Subtrahend-Threshold value ST, increasing ST from thirty-five to seventy (70=35+35).

In cell periods zero to four, no valid cell is detected, so VC remains inactive and the same operations take place as in FIG. 4. In cell period four, the CA signal goes high and a valid cell slot V1 is designated.

In cell period five, the valid cell detection unit 36 detects a valid user cell U1 in cellstream CS1 and activates the Valid Cell signal. The user cell is passed into cellstream CS2, and will remain present in the cellstream output on the external transmission path 47.

When a user cell such as U1 is detected, since part of the TC-layer bandwidth (A) must be assigned to this cell, there is a sudden increase in the consumption of the TC-layer bandwidth A in the vicinity of the user cell. This bandwidth is consumed regardless of the results of operations performed in the control circuit, because the user cell must be transmitted to the node (not visible) at the far end of the external transmission path 47.

To compensate for this consumption of bandwidth, the control circuit must delay the next assertion of the Cell Assignment signal. It is for this reason that, when the user cell is detected and the Valid Cell signal VC becomes active, the threshold control unit 35 doubles the ST value from thirty-five to seventy.

The AA value, which had returned from forty in cell period four to five in cell period five, now increases in increments of ten over the next several cell periods, while remaining below the new threshold value of seventy. This threshold value is finally exceeded in cell period eleven, at which point the Cell Assignment signal CA goes high and a valid cell slot V2 is designated for possible insertion of a quality management cell. This second valid cell slot occurs in the same position as the third valid cell slot V3 in FIG. 4, reflecting the fact that a valid cell slot has been consumed by the user cell U1 in the interim. Responding to the high Cell Assignment signal, the threshold control unit 35 returns the Subtrahend-Threshold value ST to thirty-five.

Subsequent operations proceed as in FIG. 4. A third valid cell sot V3, equivalent to V4 in FIG. 4, is designated for possible insertion of a quality management cell in cell period fourteen.

User cells have priority over quality management cells, so if a user cell were to be detected in a cell period that had already been designated for possible insertion of a quality management cell, the corresponding cell slot would be assigned to the user cell, even if there were a quality management cell waiting to be transmitted.

In the example in FIG. 5, if quality management cells are inserted in all of the available cell slots, they will outnumber the user cells, of which there is only one, so that the TC-layer bandwidth A is occupied principally by quality management cells. It is more common, however, for user cells to outnumber quality management cells. In any case, as the density of user cells in the bandwidth increases, the density of valid cell slots available for assignment to quality management cells decreases in compensation. Conversely, as the density of user cells decreases, the density of valid cell slots available for assignment to quality management cells increases. Under all conditions, the invention operates to maintain an even distribution of cell slots assignable to quality management cells and ensure that the insertion of quality management cells does not cause the sum of the bandwidth occupied by user cells and the bandwidth occupied by quality management cells to exceed the TC-layer bandwidth A.

For this reason, in the outgoing direction, the cellstream can be converted from the speed or bandwidth B of the ATM layer to the speed or bandwidth A of the TC layer without the need for a large buffer memory, and without the need to drop user cells.

In the incoming direction, the even distribution of bandwidth A in bandwidth B enables processing such as cell header conversion to be executed at a lower speed than if the cells assigned as part of bandwidth A were to be concentrated in one part of bandwidth B; that is, if these cell were to be bunched up in the cellstream leaving the quality management unit 43. The necessary processing can therefore be accomplished with less hardware.

If the TC layer 40A is altered, the associated bandwidth A may change, but no corresponding change in the control circuits in the ATM layer 40B is necessary, except to change the A value supplied to the adder 32. This simplifies the manufacture and reduces the cost of the interface unit 40.

Figure 6:
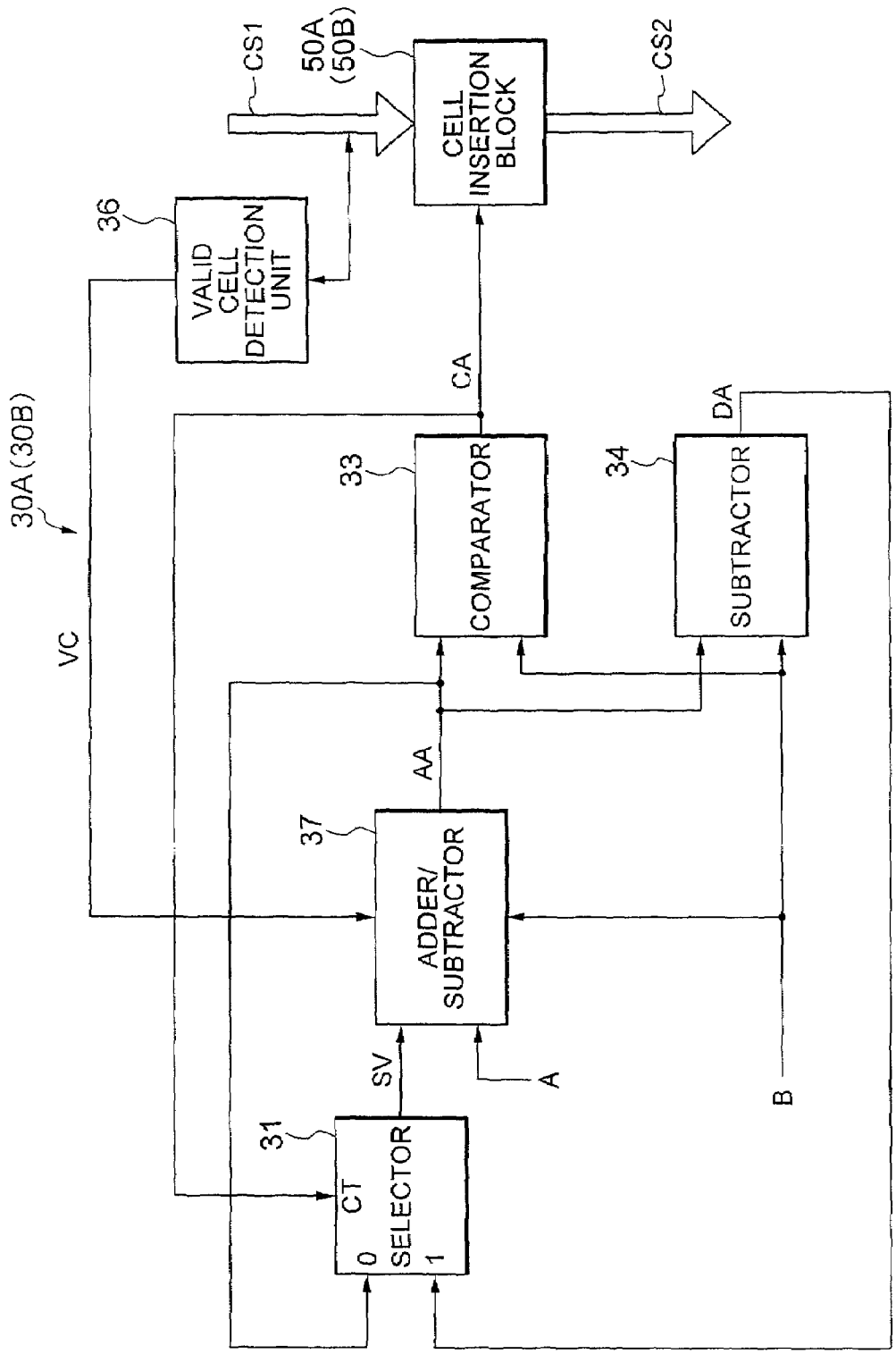
FIG. 6 illustrates a variation of the control-circuit structure in FIG. 3.

In a variation of the embodiment described above, the Subtrahend-Threshold value ST is kept constant, and the first arithmetic unit is modified to perform both addition and subtraction. The first arithmetic unit performs addition as described above (A+SV=AA), and subtracts the internal bandwidth B from the selected value SV, thereby reducing the sum AA of SV and A, when a user cell is detected. The threshold control unit 35 can then be eliminated. This variation is illustrated in FIG. 6. The first arithmetic unit is an adder/subtractor 37 that replaces the adder 32 of FIG. 3.

In another variation, only control circuit 30A and cell insertion block 50A have the invented configuration. The insertion of quality management cells in the incoming direction, in which the bandwidth increases from A to B, is controlled by conventional means. The insertion of quality management cells is unlikely to cause serious problems in this direction of increasing bandwidth.

In still another variation, the control circuit 30A is disposed in the quality management unit 43 instead of the ATM cell-processing unit 42. Alternatively, the control circuit 30A may be disposed in a location outside the interface unit 40. The insertion of quality management cells may also take place outside the interface unit 40.

Needless to say, the bandwidth values (A=10, B=35) in the embodiment above were only illustrative; the invention can be practiced with any bandwidth values A and B (preferably with A$\leq$B).

The invention is not limited to ATM transmission apparatus; it can be applied to any type of transmission apparatus having an internal transmission path with a bandwidth B that exceeds the external bandwidth A of the transmission line to which the apparatus is connected, in order to distribute bandwidth A evenly within bandwidth B. The component elements of the control circuit remain an arithmetic unit that adds the value of A to a selected value SV at certain intervals, a comparator that compares the resulting sum AA with a threshold value ST derived from the internal bandwidth B, another arithmetic unit that subtracts this threshold value ST from the sum AA to obtain a difference DA, a selector that selects either AA or DA as the selected value SV according to the comparator output, and preferably a detection unit that monitors the bandwidth B to detect parts that have already been assigned as part of the bandwidth A. The comparator output is used to assign other parts of the internal bandwidth B to the external bandwidth A.

The bandwidth assigned in accordance with the comparator output need not be used for the insertion of quality management cells; other types of cells may be inserted. More generally, the bandwidths A and B may be divided into any type of fixed-length data units or unit signals, which need not be referred to as cells.

The invention can be practiced in either hardware or software.

Those skilled in the art will recognize that further variations are possible within the scope claimed below.

What is claimed is:

1. A method of controlling the insertion of first unit signals into a stream of second unit signals transmitted from a first transmission path having a first bandwidth to a second transmission path having a second bandwidth, by assigning points at which the first unit signals may be inserted, the first unit signals and the second unit signals having a predetermined length, the method comprising the steps of:
    (a) adding a value representing the second bandwidth to a selected value, thereby obtaining a sum value;
    (b) comparing the stun value with a threshold value representing the first bandwidth, thereby generating an assignment signal designating the points at which the first unit signals may be inserted;
    (e) subtracting the threshold value from the sum value, thereby obtaining a difference value;
    (d) selecting one of the sum value and the difference value as the selected value, responsive to the assignment signal; and
    (e) repeating said steps (a) to (d) at unit intervals equivalent to the predetermined length.

2. The method of claim 1, wherein the first bandwidth is greater than the second bandwidth.

3. The method of claim 1, further comprising the steps of:
    (f) detecting the presence of second unit signals having priority over the first unit signals in the stream, before the insertion of the first unit signals; and
    (g) increasing the threshold value when one of the second unit signals having priority over the first unit signals is detected.

4. The method of claim 1, further comprising the steps of:
    (f) detecting the presence of second unit signals having priority over the first unit signals in the stream, before the insertion of the first unit signals; and
    (g) subtracting the threshold value from the selected value, thereby reducing the sum value, when one of the second unit signals having priority over the first unit signals is detected.

5. The method of claim 1, wherein the first unit signals and second unit signals are asynchronous-transfer-mode cells, and the unit intervals are cell periods equivalent to an asynchronous-transfer-mode cell length.

6. The method of claim 5, wherein the first unit signals are asynchronous-transfer-mode quality management cells and the second unit signals include asynchronous-transfer-mode user cells.

7. A transmission control device for controlling the insertion of first unit signals into a stream of second unit signals transmitted from a first transmission path having a first bandwidth to a second transmission path having a second bandwidth by assigning points at which the first unit signals may be inserted, the first unit signals and the second unit signals having a predetermined length, the method comprising the steps of:
    a first arithmetic unit adding a value representing the second bandwidth to a selected value, thereby obtaining a sum value;
    a comparator connected the arithmetic unit, comparing the sum value with a threshold value representing,the first bandwidth, thereby generating an assignment signal designating the points at which the first unit signals may be inserted;
    a second arithmetic unit connected to the comparator, subtracting the threshold value from the sum value, thereby obtaining a difference value; and a selector connected to the second arithmetic unit, selecting one of the sum value and the difference value as the selected value, responsive to the assignment signal;

wherein the first arithmetic unit, the comparator, the second arithmetic unit, and the selector operate at unit intervals equivalent to the predetermined length.

8. The transmission control device of claim 7, wherein the first bandwidth is greater than the second bandwidth.

9. The transmission control device of claim 7, further comprising:
   a detection unit detecting the presence of second unit signals having priority over the first unit signals in the stream, before the insertion of the first unit signals, thereby generating a detection signal VC; and
   a threshold control unit connected to the comparator and the detection unit, increasing the threshold value when one of the second unit signals having priority over the first unit signals is detected.

10. The transmission control device of claim 7, further comprising:
    a detection unit connected to the first arithmetic unit, detecting the presence of second unit signals having priority over the first unit signals in the stream, before the insertion of the first unit signals, thereby generating a detection signal VC;
    wherein the first arithmetic unit subtracts the threshold value from the selected value, thereby reducing the sum value, when one of the second unit signals having priority over the first unit signals is detected.

11. The transmission control device of claim 7, wherein the first unit signals and the second unit signals are asynchronous-transfer-mode user cells, and the unit intervals are cell periods equivalent to an asynchronous-transfer-mode cell length.

12. The transmission control device of claim 11, wherein the first unit signals are asynchronous-transfer-mode quality management cells, and the second unit signals include asynchronous-transfer-mode user cells.

13. The transmission apparatus including the transmission control device of claim 7 and a cell insertion block for inserting the first unit signals in said stream, wherein the first transmission path is internal to the transmission apparatus and the second transmission path is external to the transmission apparatus.

* * * * *